US006866224B2

(12) United States Patent
Smith et al.

(10) Patent No.: US 6,866,224 B2
(45) Date of Patent: Mar. 15, 2005

(54) SEAPLANE WITH RETRACTABLE TWIN FLOATS

(75) Inventors: Alan John Smith, West Lakes (AU); Grenfell Saxon Rudduck, Norwood (AU)

(73) Assignee: Tigerfish Aviation Pty Ltd. (AU)

( * ) Notice: Subject to any disclaimer, the term of this patent is extended or adjusted under 35 U.S.C. 154(b) by 0 days.

(21) Appl. No.: 10/362,436

(22) PCT Filed: Aug. 22, 2001

(86) PCT No.: PCT/AU01/01042

§ 371 (c)(1),
(2), (4) Date: Feb. 20, 2003

(87) PCT Pub. No.: WO02/16198

PCT Pub. Date: Feb. 28, 2002

(65) Prior Publication Data

US 2003/0164424 A1 Sep. 4, 2003

(30) Foreign Application Priority Data

Aug. 22, 2000 (AU) .............................. PQ9573

(51) Int. Cl.$^7$ .............................................. B64C 25/54
(52) U.S. Cl. ..................................................... 244/101
(58) Field of Search ................................ 244/101, 105, 244/106, 107, 100 R

(56) References Cited

U.S. PATENT DOCUMENTS

| 1,639,796 | A | * | 8/1927 | Congdon | 244/105 |
|---|---|---|---|---|---|
| 2,204,457 | A | * | 6/1940 | Vogt | 244/102 R |
| 2,207,735 | A | * | 7/1940 | Herb | 244/102 R |
| 2,285,330 | A | | 6/1942 | Dowden et al. | |
| 2,320,574 | A | * | 6/1943 | Dornier | 244/102 R |
| 2,347,841 | A | * | 5/1944 | Parker | 244/106 |
| 2,361,293 | A | * | 10/1944 | Hugh | 244/102 R |
| 3,790,109 | A | * | 2/1974 | Fischer | 244/105 |
| 6,042,052 | A | * | 3/2000 | Smith | 244/105 |
| 6,290,174 | B1 | * | 9/2001 | Gioia | 244/105 |

FOREIGN PATENT DOCUMENTS

| DE | 949988 | * | 9/1956 | | 244/101 |
|---|---|---|---|---|---|
| GB | 154122 | * | 12/1950 | | 244/105 |
| RU | 2083439 C1 | | 7/1997 | | |
| SU | 1200531 A | | 5/1991 | | |
| WO | WO-95/05974 A2 | | 3/1995 | | |

* cited by examiner

*Primary Examiner*—Tien Dinh
(74) *Attorney, Agent, or Firm*—Akerman Senterfitt

(57) ABSTRACT

A twin float aircraft (1) which has a retractable float (4 and 5) for each side of a fuselage (3) providing buoyancy for the aircraft during take off and landing and reduced air resistance during flight with each of the floats (4 and 5) being articulated (12 and 13) to assist streamline alignment when retracted.

24 Claims, 11 Drawing Sheets

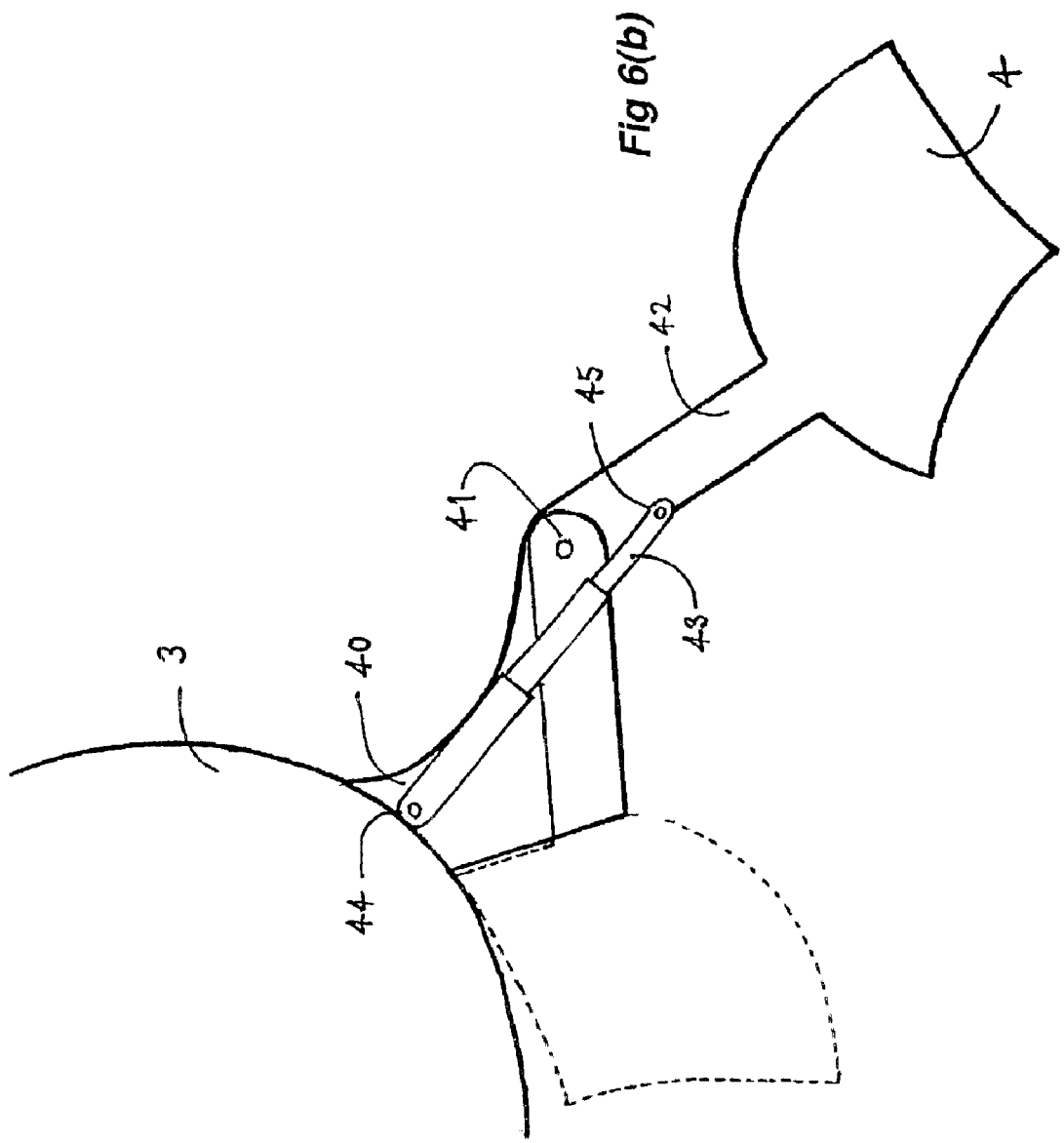

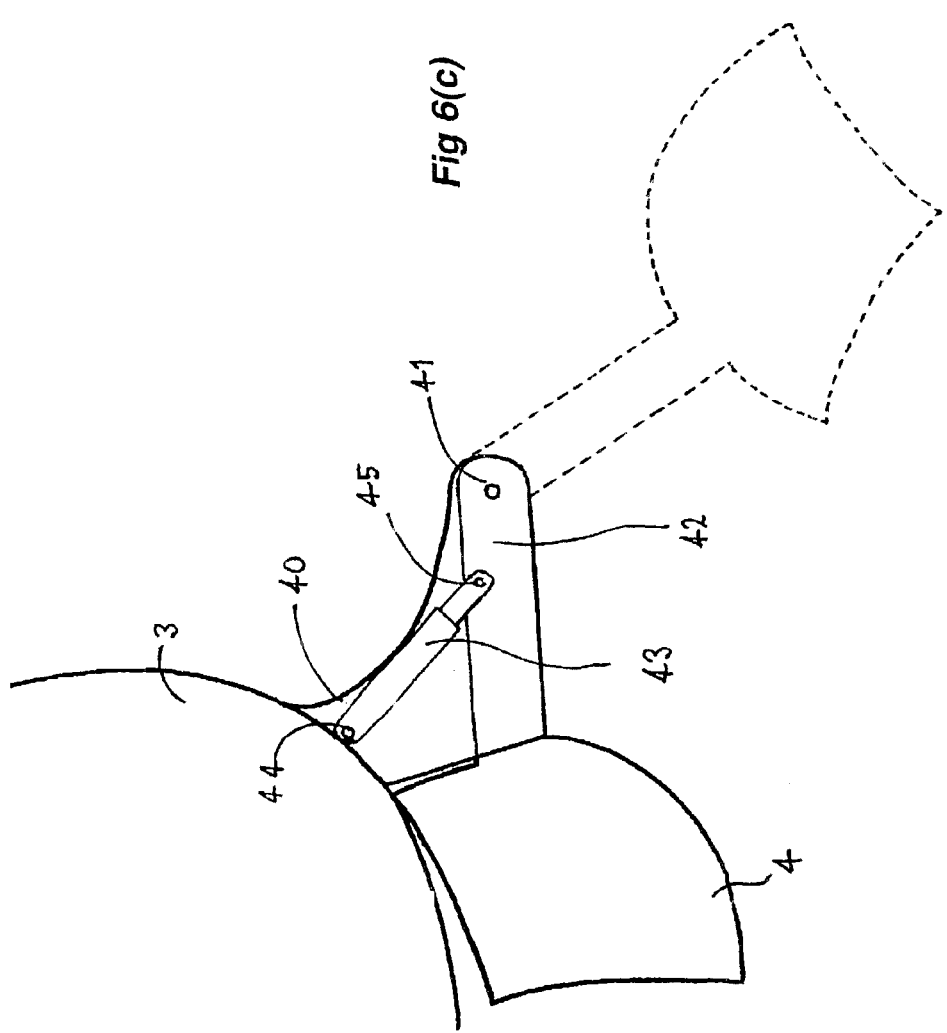

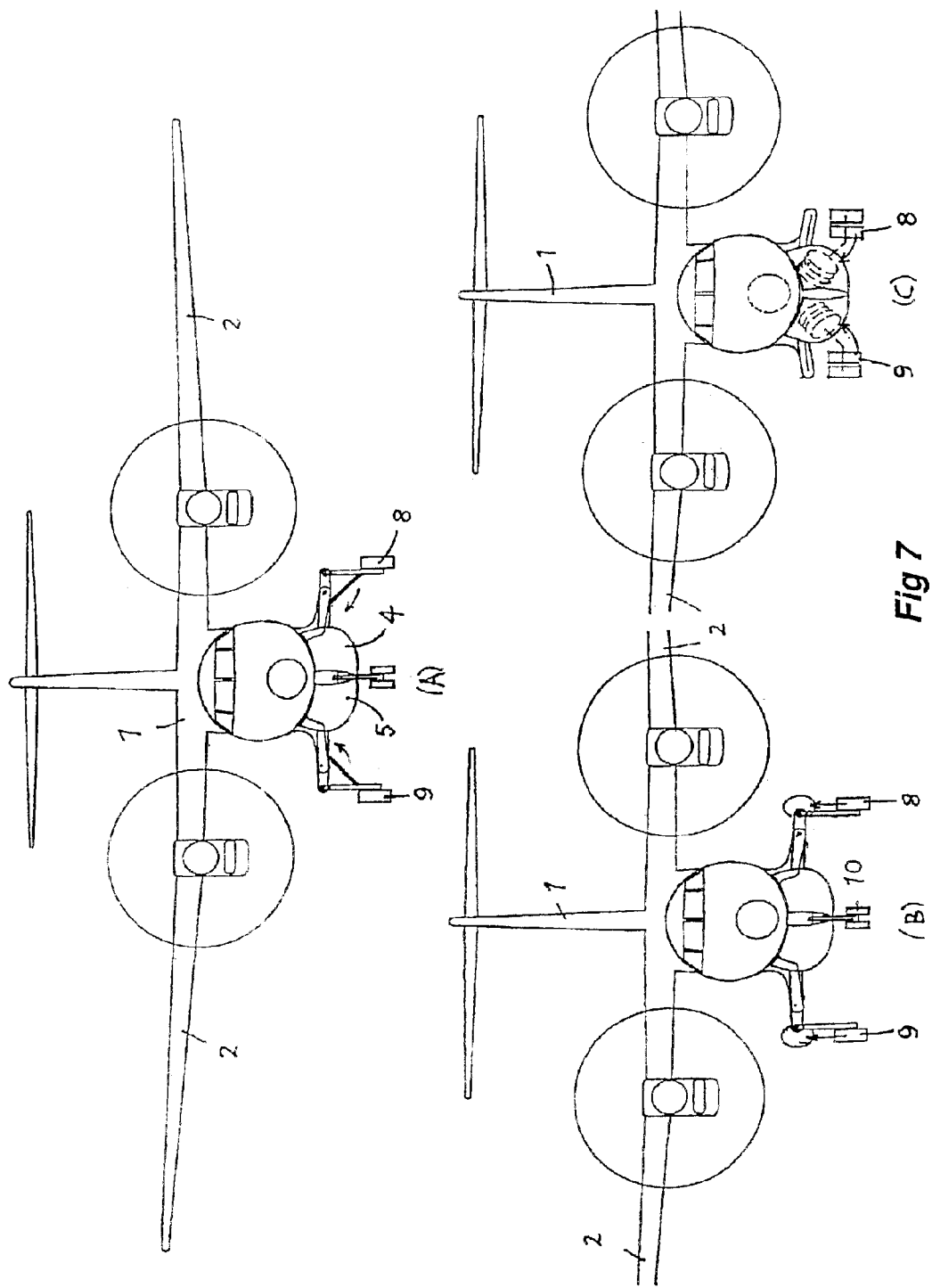

SEAPLANE WITH RETRACTABLE TWIN FLOATS

This invention relates to twin float aircraft.

TECHNICAL FIELD

The term "twin float aircraft" is used to distinguish aircraft having a float located to each side of a centre line aligned in a forward to aft alignment of the aircraft where the respective floats provide a substantial proportion at least of flotation for the aircraft and do not act merely as stabilisers.

This then is to distinguish such aircraft from seaplanes which may have stabiliser floats depending from a respective wing.

BACKGROUND ART

Twin float aircraft are well known and conventionally provide for a float to be fixedly secured to be positioned somewhat below and somewhat to a side in each case of a wing and a fuselage respectively.

A main current issue is that having floats in this position are simply not aerodynamically efficient.

One of the issues addressed by this invention is to provide an arrangement which allows for improvement of aerodynamic efficiency in connection with twin float aircraft.

DISCLOSURE OF THE INVENTION

In one form of this invention, there is proposed a twin float aircraft with its floats arranged to at least substantially support the aircraft in a floating on water status providing sufficient buoyancy and stability for the aircraft during take off and landing, the aircraft having a first of the floats located to one side of a main fuselage of the aircraft, and a second of the floats located to a second side of the main fuselage which is opposite to the said first side of the main fuselage of the aircraft, the floats each being secured to the aircraft so that they can each assume at least two positions, a first of which is an extended position and a second of which is a retracted position, the floats being each arranged when in the retracted position to be located with respect to the main fuselage so that a substantial portion of the surface area of each respective float is shielded from contributing substantially to air flow resistance of the aircraft when in flight.

In preference as an alternative the invention can be said to reside in a twin float aircraft with its floats each being secured to the aircraft so that they can each assume at least two positions, a first of which is an extended position and a second of which is a retracted position, and being arranged when in an extended position, to at least substantially support the aircraft in a floating on water status providing sufficient buoyancy and stability for the aircraft during take off and landing, the aircraft having a first of the floats located to one side of a main fuselage of the aircraft, and a second of the floats located to a second side of the main fuselage which second side is opposite to the said first side of the main fuselage of the aircraft, the floats being each arranged when in the retracted position to be located with respect to the main fuselage so that a substantial portion of the surface area of each respective float is shielded from contributing substantially to air flow resistance of the aircraft when in flight, each of the floats having a portion which is articulated with respect to a further part of the float, and being arranged such that when the float is supported to be in an extended position, the float has a first articulated position, and when the float is supported to be in a retracted position, the float has a second articulated position which is different from the said first articulated position.

In preference at least one of the floats is comprised of at least two portions one of which is at or is a forward end of the float and one of which is at or is a rearward end of the float, the two portions being connected so that they are moveable one with respect to the other and are articulated thereby.

In preference, each of the floats in a retracted position is located so as to be positioned in an adjacent relationship with a fuselage of the aircraft.

In preference, each float when in a retracted position is positioned so that surfaces of the respective float which were lowermost in the extended position are positioned to not be outer surfaces when in the retracted position.

The value of this feature is that surfaces which would become water wetted surfaces while the aircraft was being supported by the floats will then be retracted to a position where the retracted position in a sense covers the formerly wet surfaces.

This has the significant advantage of further assisting aerodynamic efficiency.

In preference, each respective float can also be positioned in a further extended position where a wheel or wheels then is or are positioned to support the aircraft directly.

In such a situation, there can be a further nose wheel which can be positioned to be retracted or extended as appropriate.

One of the issues with the arrangement described is that in order to have a float that is most appropriate for supporting the aircraft for take off and landing, is that, such a float may not have an appropriate shape to be most appropriately positioned relative to the aircraft when in a retracted position to offer an appropriate contouring for good aerodynamic efficiency.

In preference then, there is provided that each float has at least one portion which is articulated with respect to a remainder of the float.

With such an articulation, it has been found that by bringing an appropriately shaped float into an aerodynamically efficient position alongside the fuselage, it is an advantage if a rear portion of the float can then be moved further in to follow a more appropriate alignment with a rear portion of the fuselage of the aircraft.

While the description has been given in connection with fixed wing aircraft, it is in preference also applicable to rotary wing aircraft and it is also applicable to smaller aircraft and unmanned aircraft including model aircraft.

From experiments that we have conducted so far, it appears that the invention can be applied in many different ways and to many different aircraft.

At least in the beginning, it is envisaged that it will be applied by incorporating a pack which will be attached to an existing developed aircraft and later it is envisaged that specifically designed aircraft will incorporate the concepts of this invention.

A number of features have been developed in order to over come specific problems related to the development of this invention including the addition of movable fairings so that when a float is adjacent a fuselage, additional arrangements can be used to make the application even more successful.

Such further developments include the use of a stub wing which can carry with it frame members to provide for support of a float both in a retracted and in an extended position, and the stub wing can be appropriately shaped to provide an aerodynamically active surface or an aerodynamically inactive surface.

Further, while reference has been made to articulating a rear portion of a respective float, a front portion of a float can also be articulated with a remainder of the body of a float again to facilitate conforming its shape to a most appropriate aerodynamically efficient alignment.

In a further preferred form, each float is arranged so that in one position it has an extendable portion so that the effective operating length is able to be changed. In one case then, this includes an arrangement where the respective floats are of an extended length when in an extended as compared to a retracted position with respect to the aircraft and such that they can each be retracted in length when being retracted with respect to the aircraft. This provides advantages of providing water stability while allowing the floats to clear a propeller when retracted.

It has been found most appropriate at this stage to provide a forward fairing attached to a fuselage and behind which a float in a retracted position is located.

In trials thus far, a float has been located so that it is thus appropriately positioned where it will lie alongside the fuselage somewhat to the side and below this.

BRIEF DESCRIPTION OF THE DRAWINGS

For a better understanding of this invention it will now be described with respect to preferred embodiments which shall be described with the assistance of drawings wherein;

FIG. 7 is three front views of the aircraft as shown in FIGS. 1a, 2a, 3a and 4a this time enlarged so that in (a) there is shown a first embodiment by which the landing gear can be retracted inwardly, (b) shows an a second embodiment by which the landing gear can be retracted in a different direction, and (c) illustrates the way in which wheels can be located within the float itself.

BEST MODE FOR CARRYING OUT THE INVENTION

Figure 1:
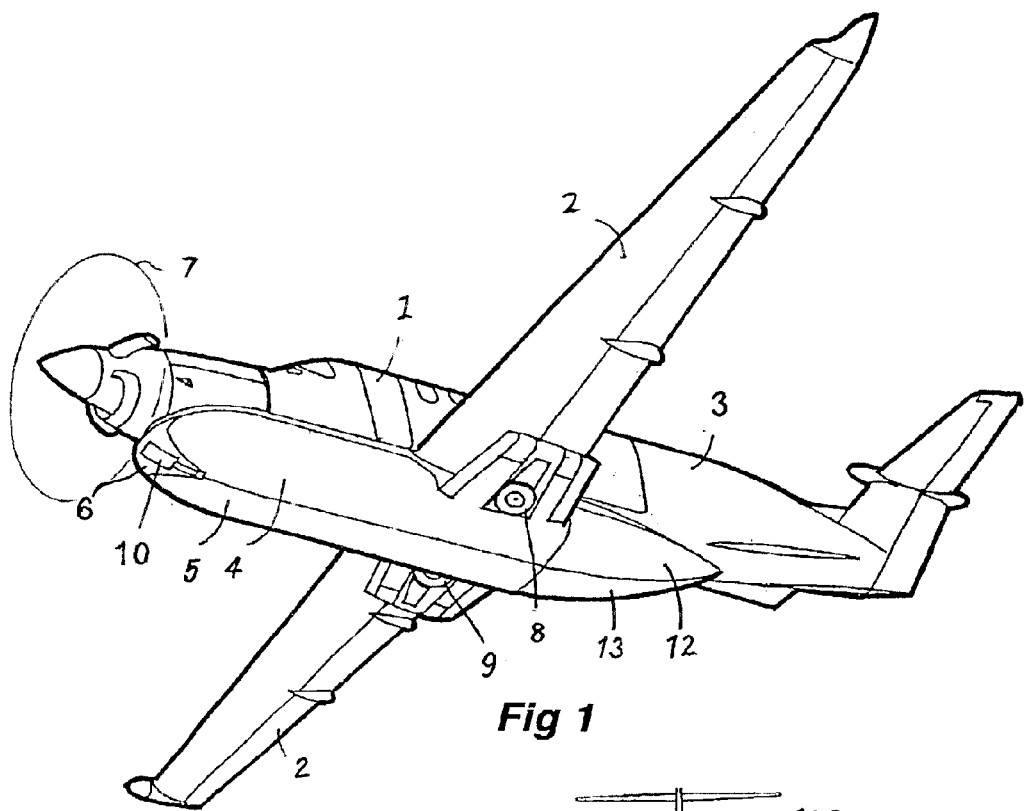
FIG. 1 is a perspective view from below of an aircraft in accordance with a first embodiment incorporating retractable floats, the aircraft being a twin float aircraft of fixed wing design and the view illustrates the aircraft from beneath with the floats in a retracted position.
Figure 1A:
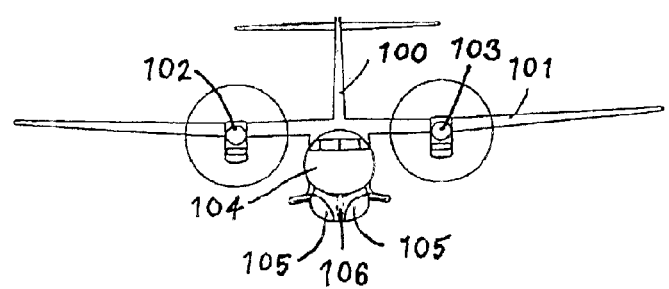
FIG. 1a is a view of a second embodiment the view being from the front of a further twin engined aircraft illustrating similar modifications as in FIG. 1 applied to such alternate aircraft and showing this in the retracted form as in FIG. 1.
Figure 2:
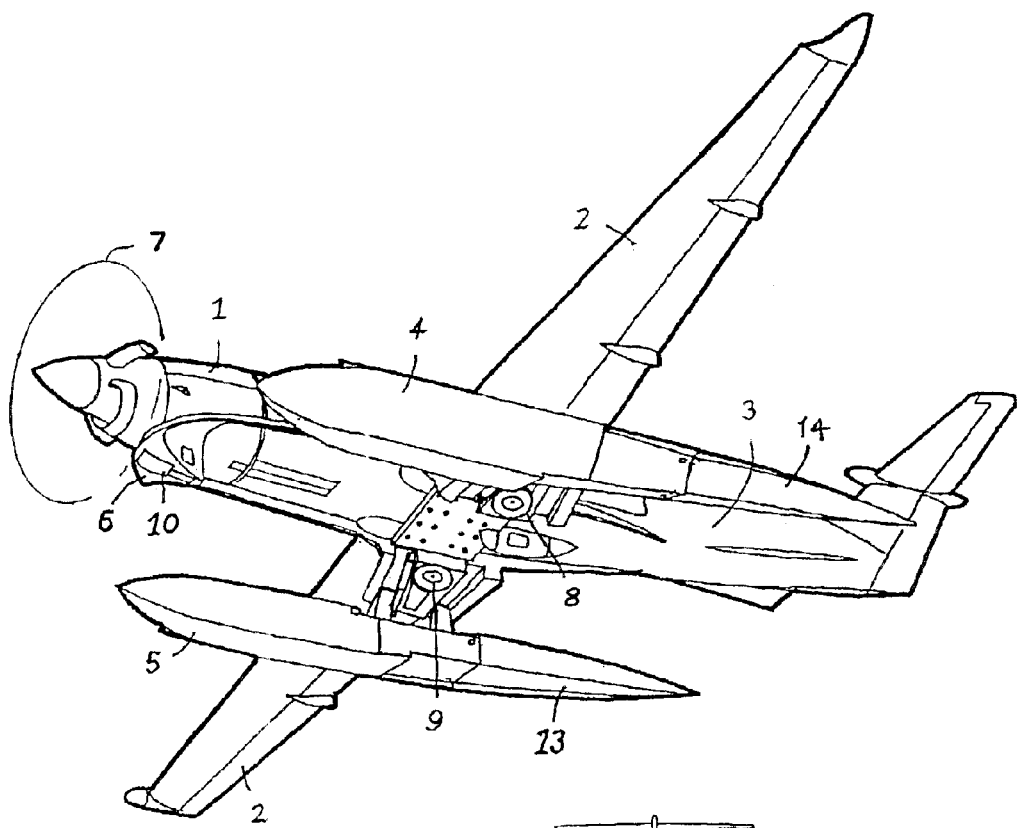
FIG. 2 is the same view as in FIG. 1 except in this case, the floats are in an extended position.
Figure 2A:
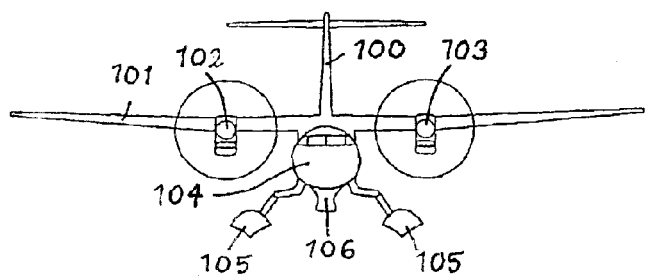
FIG. 2a is a front view of the same twin engine aircraft as in FIG. 1a illustrating the position of the floats when in an extended position as applied to this other aircraft.

Now referring to the drawings and in particular to FIGS. 1, 2, 3, 4 and 5, each of these illustrate a twin float aircraft 1 which has fixed wings 2, a main body or fuselage 3, and extending through a forward to rearward alignment of the aircraft 1, floats 4 and 5.

The floats 4 and 5 in each case are positioned so as to be located in a retracted position at least, behind a fairing 6 which is secured beneath the fuselage 3 and positioned just behind the propeller 7. This fairing 6 forms thereby a portion of the main fuselage 3 which is at a forward part of the fuselage 3 and such that, in the retracted position, each of the floats 4 and 5 is positioned relative to the fairing 6 so that there is an alignment providing a substantially streamline shape across the fairing 6 and from the fairing 6 to each respective float 4 and 5 each of which is located behind the fairing 6.

In addition, in each case, there is shown appropriately, two side wheels 8 and 9 and a nose wheel 10.

There are simple means to effect the articulation of one portion of a float with another portion of a float. This will use hydraulic rams (although a screw jack, electric motor or pneumatic air ram could be used) and pivots so that a pilot or controller can then both remotely effect the extent of articulation and also ensure that there is an interlock effective when the articulated portion is moved to an operating position. The details of these relatively conventional mechanical connections and members are shown specifically in FIG. 5 as 60 and 61.

Figure 6A:
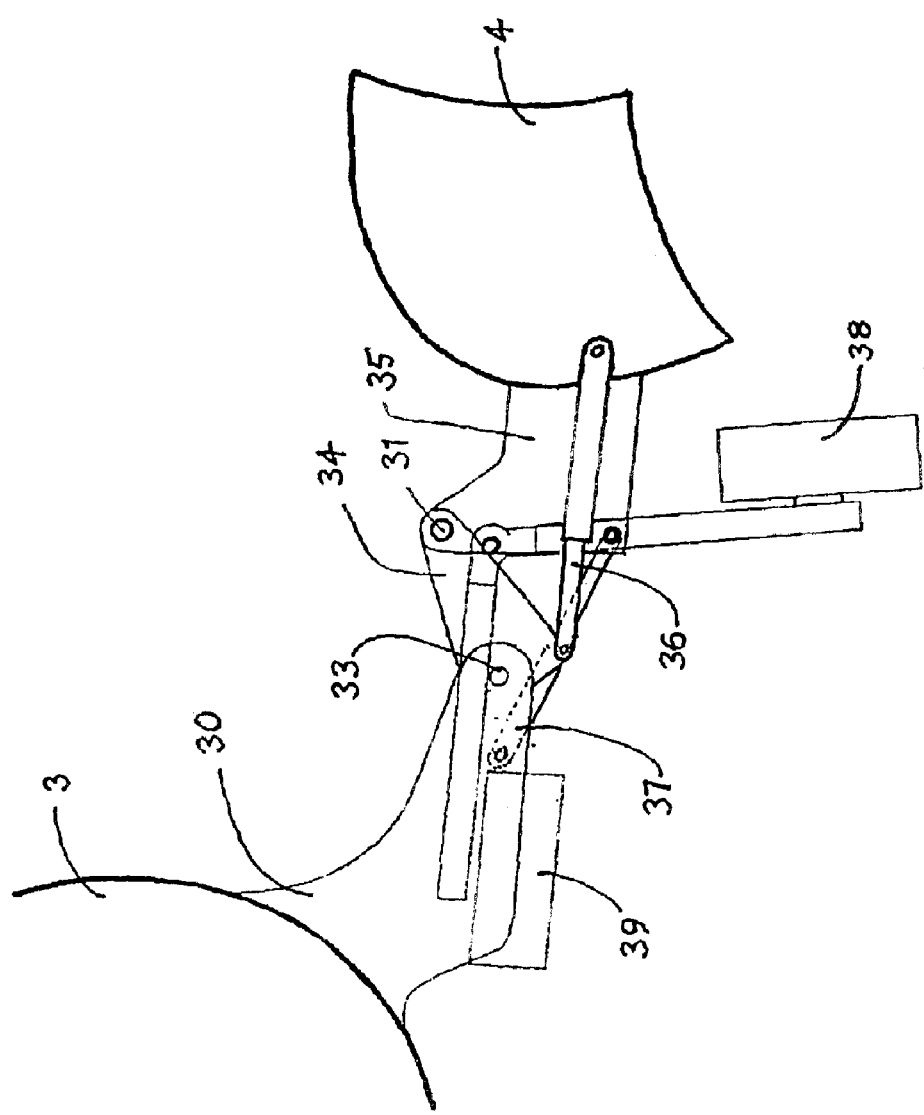
FIG. 6 (a) is a part front view of connecting elements providing for support for each of the floats for each of the several aircraft types previously shown, this showing the connections as one embodiment of how these elements can support landing gear and the floats for retraction and extension and a hydraulic ram to effect this relative movement between these respective members.
FIGS. 6(b) and 6(c) are a side view of a support and extending retraction mechanism showing in (b) the float on one side in an extended position with the retracted opposition in dotted outline and the reverse being shown in (c).

The mechanism for retracting or extending the floats 4 and 5 with respect to the fuselage 3 includes pivotally secured link members as shown at FIG. 6 which will be described in greater detail later, which are such that the floats 4 and 5 can be selectively and jointly extended while the aircraft 1 is in flight and as well retracted while the aircraft is in flight and, as necessary, the landing gear in this embodiment which are the wheels 8, 9 and 10, can be lowered or lifted again as required by the pilot for the purpose required.

By this relatively straight forward adjustment in position of floats 4 and 5, significant savings in terms of a reduction in effective air resistance when the aircraft is in flight, can be achieved. Significant savings have been calculated which can be made possible by this arrangement.

As can be seen, by use of the arrangement a substantial portion of the surface area of each respective float (as well as the adjacent fuselage surface) is shielded from contributing substantially to air flow resistance of the aircraft when in flight The advantages achieved through use of the embodiment according to this invention have thus far been calculated with respect to existing aircraft types and as an illustration of this we now refer to the results of calculations in connection with one aircraft type a Cessna C208 Caravan.

The comparison is between published data with respect to this aircraft which is provided with respect to such an aircraft with fixed floats as compared to modifications in accordance with this invention in which the floats in the one instance are extended, and in the other are retracted to an adjacent position with respect to the body with a front fairing and with rear portions of the floats each being articulated so that in the retracted position each float has its rear portion articulated to follow more closely the outside alignment of the aircraft body.

In some comparison if such an aircraft not fitted with floats then is assessed to have 100 units of drag then it will typically have 145 units of drag when fitted with fixed floats.

The calculated advantage using this invention then is that with the same aircraft, it will have only 120 units of drag or 17% less drag than the fixed float installation when the retractable floats are in the retracted position.

This improvement can be used either to provide an increased range for the aircraft, an increased payload, an increased speed or additional altitude or any combination of these.

Figure 3:
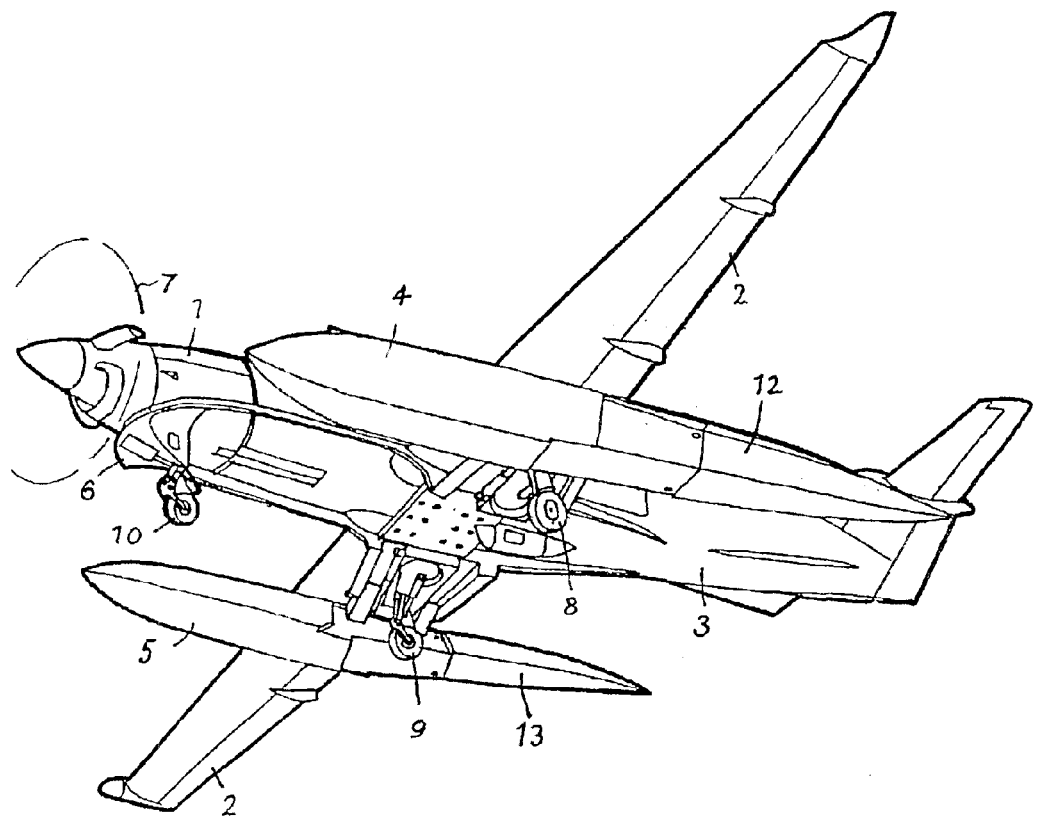
FIG. 3 is the same perspective view from beneath the aircraft as in FIGS. 1 and 2 where however, the floats have been further extended and landing gear has now been lowered so as to be operable to enable the aircraft to taxi to and from water to land and land to water.
Figure 3A:
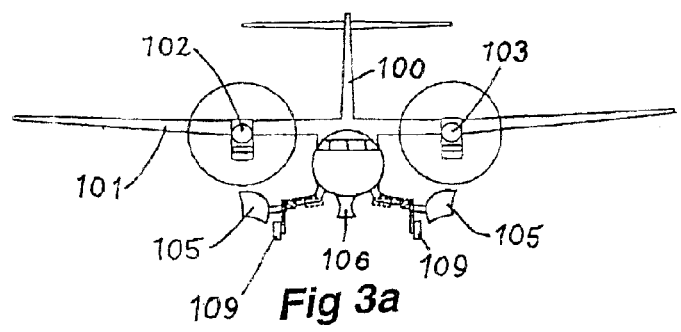
FIG. 3a is a front view of the second aircraft as in FIGS. 1a and 2a showing the floats in the same relative further extended position as shown in FIG. 3 with a landing carriage lowered.
Figure 4:
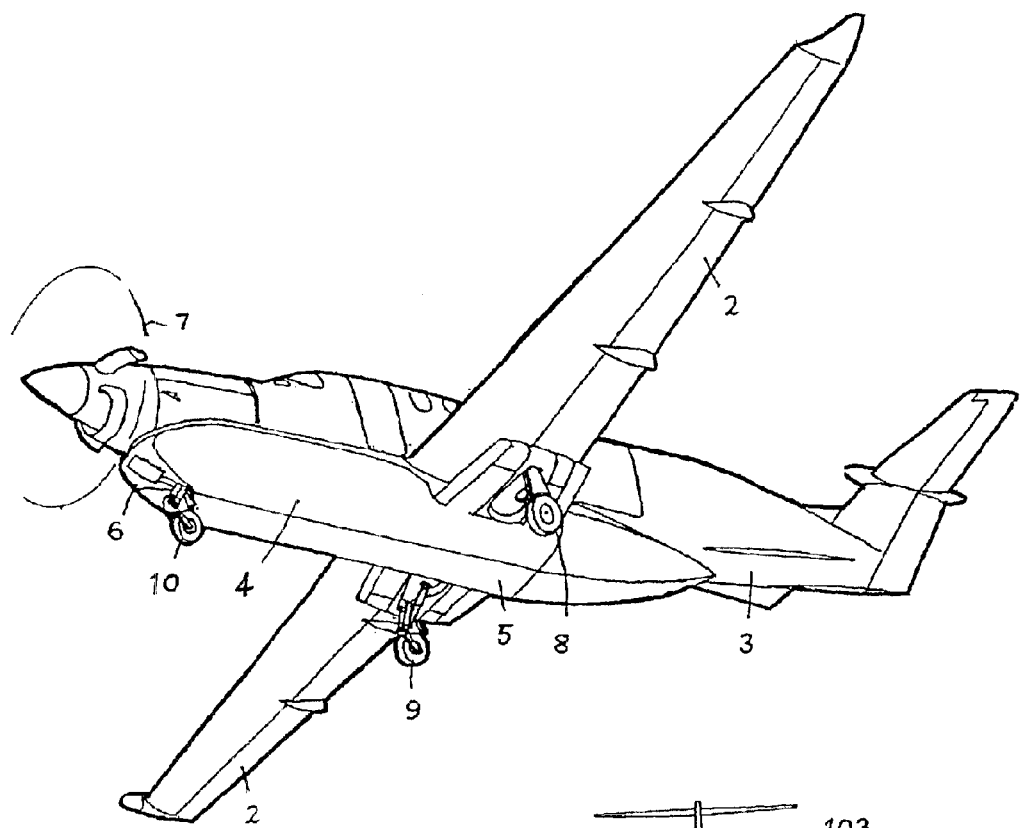
FIG. 4 is a perspective view from beneath of the aircraft as in FIGS. 1, 2 and 3 wherein this case the floats have been kept in a fully retracted position and landing gear which include two side wheels and a nose wheel have been lowered to provide landing support on land for the aircraft which allows the aircraft to conventionally land or take-off.
Figure 4A:
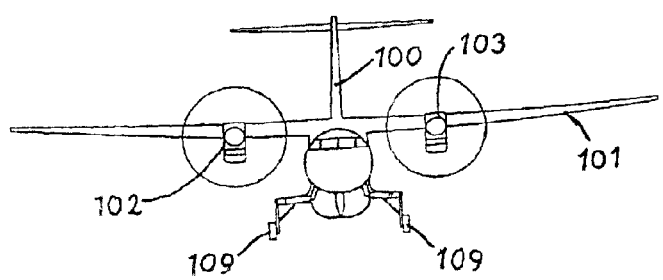
FIG. 4a is a front view of the aircraft as in FIGS. 1a, 2a and 3a with the landing gear also extended for a conventional landing on land while the floats remain fully retracted.

Having floats that can then be controlled in position, leads to further advantages and a first of these is illustrated in FIGS. 3 and 6.

Where a float aircraft lands on water, it now becomes possible to taxi toward the shore and when in appropriately shallow water, the floats can then be further extended with the wheels being lowered so that taxiing can then continue for the aircraft to run up on the shore or beach on its wheels.

This then will provide very significant advantages especially when the aircraft is to be stored over a period, or where the water might be inappropriate for supporting the aircraft for instance in very tempestuous weather. Further, there is advantage for loading or unloading on land as compared to water.

One of the features of each of the floats in the arrangement described is that in order to pack this beneath the fuselage, a significant breakthrough solution has been found which is to provide that a rear portion be articulated with respect to a forward portion of the float.

Figure 5:
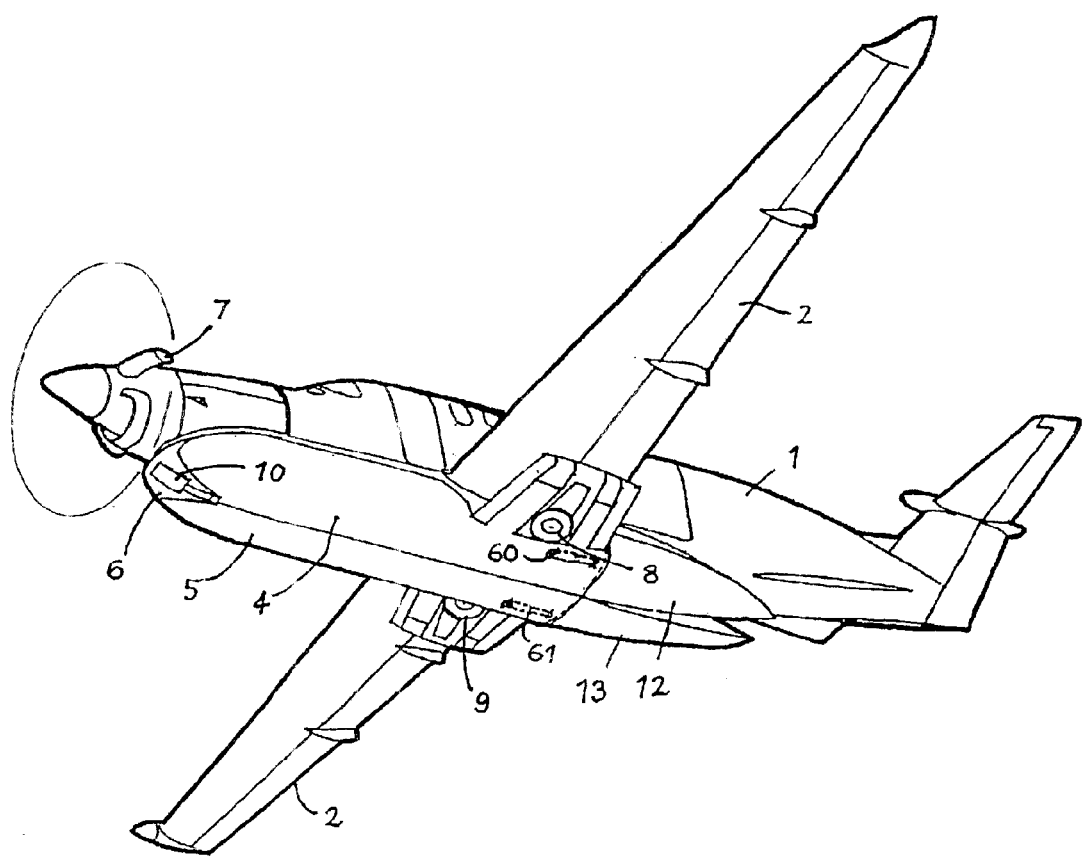
FIG. 5 is a view from beneath again in perspective as in FIGS. 1 through 4 illustrating the position of the rear of each respective float when positioned prior to deployment to an extended position for a water landing position.

A first position which is to say the position that the floats 4 and 5 come to when they are first brought into a retracted position, is shown in FIG. 5 with the articulatable portions being shown at 12 and 13. There are arrangements operable by a pilot (in the case of a manned flight or controller in the case of an unmanned flight) which include two hydraulic rams which simply rotate each respective rear portion 12 and 13 so that they firstly come together and fit with an uptilt so that they can form closely to the adjacent side of the underneath of the rear portion of the body of the aircraft 1.

Referring to FIG. 6 (a), for each side of the fuselage 3 of the aircraft 1 there is a leg 30 extending out from the fuselage 3 with a pivot 33 to which a connecting plate 34 is supported at one end extending beyond the leg 30 to a pivot 31 to which an arm 35 is supported which is connected to and supports the float 4. Hydraulic ram 36 is connected between plate 34 and the float 4 to operate effectively a connection which allows for the further extended positioning of the float 4 (or 5 in the other side). Hydraulic ram 37 is positioned to control the position of plate 34 relative to the fuselage 3 and therefore the extending of the float 4 between the retracted and extended position. There is shown a retractable wheel 38 which is retractable to the position shown at 39.

The protrusion of the pivot 33 below a stub wing in the flight mode will have a relatively low aerodynamic drag.

Referring to FIGS. 6 (b) and (c), for each side of the fuselage 3 of the aircraft 1 there is a fixed leg 40 extending out from the fuselage 3 with a pivot 41 to which leg 42 is attached which supports the float 4. Hydraulic ram 43 secured between a pivot at 44 with the fixed leg 40 has its outer end secured with a pivot connection 45 to the leg 42 which then enables this to control the position of the float 4 between the extended position as shown in FIG. 6 (b) and the retracted position as shown in FIG. 6 (c).

Now referring again to the articulated float, a further advantage of the articulated float is the fact that this can allow for a greater angle of rotation of the aircraft on takeoff from land when the floats are in a retracted position and where the aircraft is using its undercarriage.

Now referring to FIGS. 1a, 2a, 3a and 4a, these are front views of a different aircraft with however the application of the invention being the same which is to say that it is incorporated in a pack and attached to a developed airplane and in each case again, it is a twin float aircraft 100 with however a high wing 101 and two engines 102 and 103 one to each side of a central fuselage 104.

The figures as described in reference to these figures then illustrate how the same concept can then apply whether the aircraft is a single front engine airplane with a low wing or twin engine high wing.

A front fairing 106 provides front streamlining behind which the floats 105 can in their retracted position nest. This also then covers a substantial part of the fuselage and reduces thereby exposed outer surface thereby reducing air drag. Wheels 109 are able to be variously positioned to be retracted as in 1a, separately extended as in 4a, retracted as in 2a with floats 105 in their extended position or in 3a where there is a third position with the extra extension of the floats.

Figure 8:
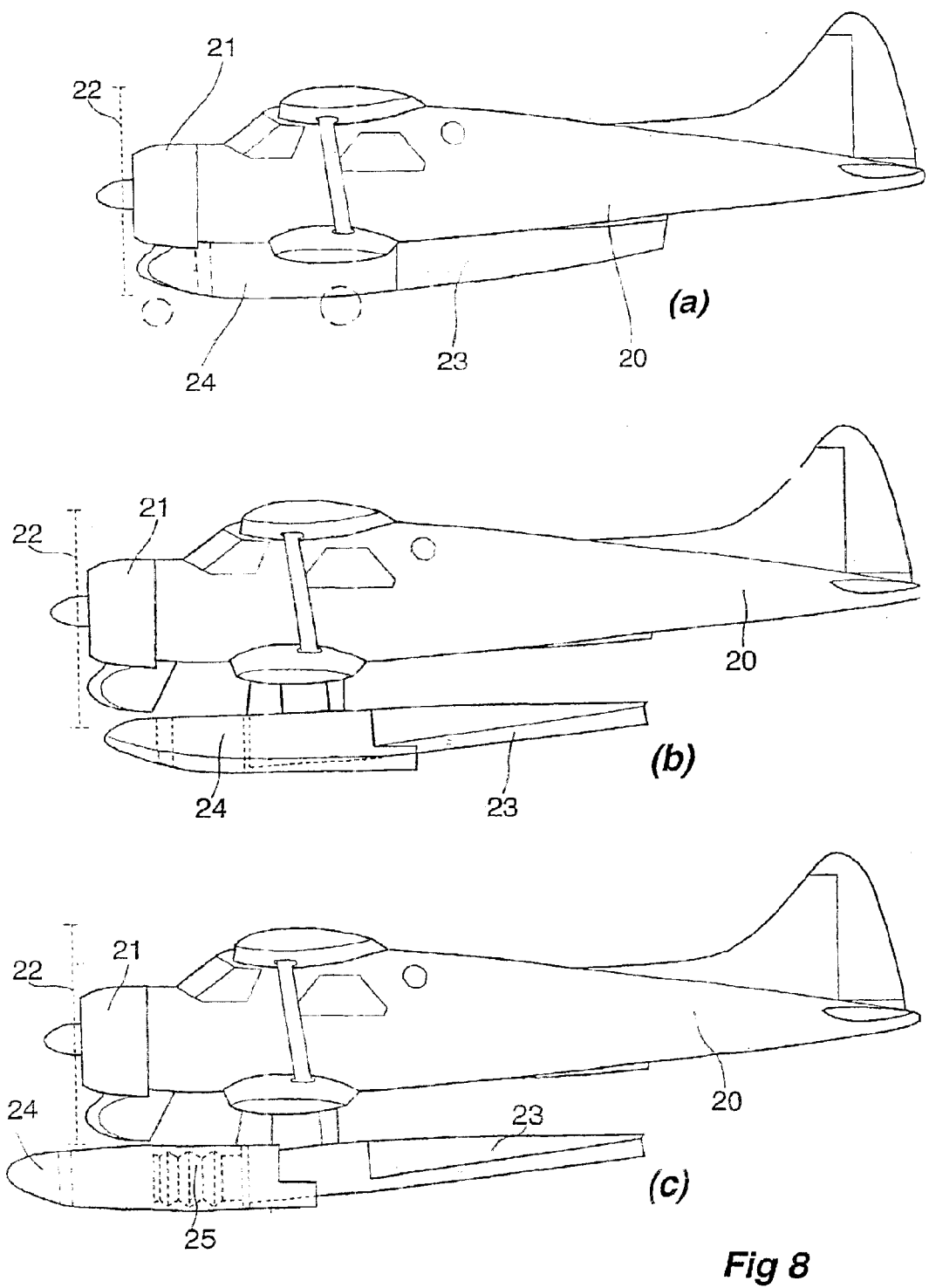
FIG. 8 is a side elevation of a further aircraft in accord with this invention. This illustrates a particular aircraft which is of a type known as a short nose tractor propeller aircraft with floats in a retracted position, (b) illustrates the floats in a now extended position but not in a fully deployed position prior to landing, and (c) illustrates the aircraft now in a fully deployed position where the floats are both extended relative to the aircraft and in respect of their length.

Now referring in detail to FIGS. 8 (a), (b) and (c) the aircraft 20 is of a type generally described as a short nose tractor propeller aircraft where there is a forward most engine at 21 with a propeller at 22.

The design issue addressed here is that, with such a relatively heavy engine, there is a need to provide buoyancy with sufficient longitudinal stability which may not be provided if the floats are restrained to a length and position determined by the retracted position.

The answer then is to provide that each of the floats 23 is adapted to be able to be extended in length by having a forward portion 24 which when in a extended position as shown in FIG. 8 (c), projects somewhat more forwardly than when in the retracted position as shown in FIG. 8 (a) or even in 8 (b).

By having this forward portion 24 able to be moved so as to extend the length of the float 23 with respect to a remainder of the float, allows for adequate longitudinal distribution of buoyancy particularly when the aircraft is landing.

The means to effect the extension of the movable portion 24 with respect to a remainder portion of the float 23 can include an inflatable bag 25 which can be used both to effect the extension or retraction in length but as well, has the advantage of providing additional flotation.

A surprising further advantage of this ability to retract each of the floats in length is the fact that this also then additionally assists in reducing aerodynamic drag.

Figure 9:
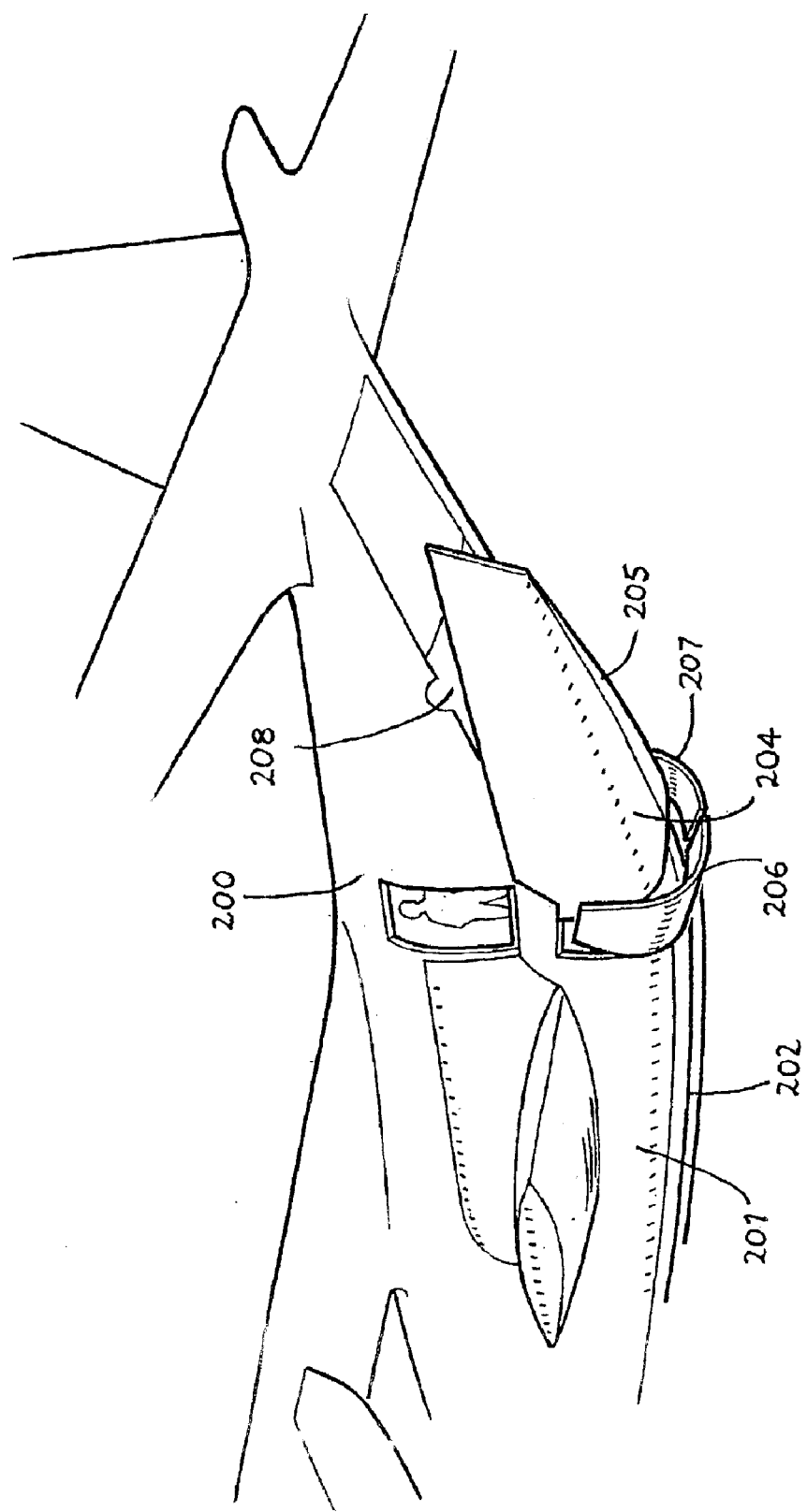
FIG. 9 is a perspective view of a further embodiment showing a rear loading type aircraft with however an articulated rearward end for each of the floats and an adjustable fairing to assist in effecting streamline flow over a connection between the articulated portion of the floats when in an upwardly inclined position after being retracted.

In FIG. 9 the aircraft 200 is of a rear loading type with floats 201 and 202 being supported to be extendable in the manner as shown with the previous embodiments with the additional features that the rear portions 204 and 205 of each of the floats 201 and 202 are articulatable. This allows for these portions to be upwardly inclined once in flight as is shown which allows for the additional surface area of the fuselage to be covered during a flight but also allows for the rotation of the aircraft during takeoff. Also this allows for access to a rear door 208 of the aircraft. Additionally the fairings 206 and 207 are arranged and supported so that the connection between the parts of the float are covered to assist in greater streamlining.

What will now be seen, then is that the invention for the first time enables significant savings to be made in connection with float planes especially in terms of operating costs and the invention further adds in relation to the further extension concept, the advantage of very ready transfer from water to land and it also allows in a further embodiment, for conventional land landings even though it is carrying floats.

The description has referred to fairings and it is understood that these could be applied in various ways so as to assist in integrating when in a retracted position, the floats are as close as they appropriately can be to the body of the aircraft.

Further fairings can be added and can be made adjustable as indeed can both a forward portion and a rear portion of the float be made articulated so as to facilitate as necessary adoption of these with respect to an existing aircraft body.

While reference has been made in each of the preceding cases to the incorporation of a pack which can be then attached to an existing developed aircraft, it is also realised that this invention can be applied to a new design of aircraft which has been developed with the purpose of integrating floats which can both be extended or retracted into an existing body where the body itself is shaped so as to encompass when in a retracted position, the floats are then nested into appropriately shaped cavities within the body.

What is claimed is:

1. A twin float aircraft comprising:
a main fuselage; and
floats arranged to at least substantially support the aircraft in a floating on water status, wherein the fuselage is positioned at least substantially above the water,
wherein the floats provide sufficient buoyancy and stability for the aircraft during take off and landing,
wherein a first of the floats is located to one side of the main fuselage of the aircraft,
wherein a second of the floats is located to a second side of the main fuselage which is opposite to the said first side of the main fuselage of the aircraft,
wherein the floats are each secured to the aircraft so that they can each assume at least two positions, a first of which is an extended position and a second of which is a retracted position, the floats being each arranged when in the retracted position to be located with respect to the main fuselage so that a substantial portion of the surface area of each respective float that acts to support the aircraft in the water in the floating on water status is shielded from contributing substantially to air flow resistance of the aircraft when in flight, and
wherein at least one of the floats is comprised of at least two portions one of which is at or is a forward end of the float and one of which is at or is a rearward end of the float, the two portions being connected so that they are moveable one with respect to the other and are articulated thereby.

2. A twin float aicraft as in claim 1 further comprising a fairing forming a portion of the main fuselage which is at a forward part of the fuselage and such that, in the retracted position, each of the floats is positioned relative to the fairing so that there is an alignment providing a substantially streamline shape across the fairing and from the fairing to each respective float.

3. A twin float aircraft as in claim 1 further comprising a fairing forming a portion of the main fuselage which is at a forward part of the fuselage and such that, in the retracted position, each of the floats is positioned relative to the fairing so that there is an alignment providing a substantially streamline shape across the fairing and from the fairing to each respective float each of which is located behind the fairing.

4. A twin float aircraft as in claim 1 wherein each of the floats is arranged and supported so as to be adapted to be able to be moved to a third position which is a position that is beyond the extended position.

5. A twin float as in claim 1 wherein each of the floats is arranged and supported so as to be adapted to be able to be moved to a third position which is a position that is beyond the extended position and a wheel is supported and located with each respective float so as to act as an undercarriage wheel for the aircraft when the respective float is so further positioned.

6. A twin float aircraft as in claim 1 wherein the aircraft is a fixed wing aircraft.

7. A twin float aircraft as in claim 1 wherein the aircraft is a model aircraft.

8. A twin float aircraft as in claim 1 wherein each of the floats in a retracted position is located so as to be positioned in an adjacent relationship with a fuselage of the aircraft.

9. A twin float aircraft as in claim 1 wherein each float when in a retracted position is positioned so that the surfaces of the respective float which were lowermost in the extended position are positioned to not be outer surfaces when in the retracted position.

10. A twin float aircraft as in claim 1 wherein there is a stub wing which can carry with it frame members to provide for support of a float both in a retracted and in an extended position.

11. A twin float aircraft comprising:
a main fuselage; and floats arranged to at least substantially support the aircraft in a floating on water status, wherein the fuselage is positioned at least substantially above the water, wherein the floats provide sufficient buoyancy and stability for the aircraft during take off and landing, wherein a first of the floats is located to one side of the main fuselage of the aircraft, wherein a second of the floats is located to a second side of the main fuselage which is opposite to the said first side of the main fuselage of the aircraft, wherein the floats are each secured to the aircraft so that they can each assume at least two positions, a first of which is an extended position and a second of which is a retracted position, the floats being each arranged when in the retracted position to be located with respect to the main fuselage so that a substantial portion of the surface area of each respective float that acts to support the aircraft in the water in the floating on water status is shielded from contributing substantially to air flow resistance of the aircraft when in flight, and wherein each of the floats is comprised of at least two portions one of which is at or is a forward end of the float and one of which is at or is a rearward end of the float, the two portions being connected so that they are moveable one with respect to the other and are articulated thereby, and such that when the floats are in an extended position they assume a first articulated position, with a forward portion being substantially linearly aligned with the rearward portion and when in a retracted position they are in a further articulated position in which the rearward portion is inclined with respect to the forward portion with a most rearward portion of the rearward portion being highest so as to substantially conform an alignment of an upper part of the float with an underneath upwardly inclined alignment of a rearward part of the main fuselage.

12. A twin float aircraft comprising:

a main fuselage; and floats arranged to at least substantially support the aircraft in a floating on water status, wherein the fuselage is positioned at least substantially above the water, wherein the floats provide sufficient buoyancy and stability for the aircraft during take off and landing, wherein a first of the floats is located to one side of the main fuselage of the aircraft, wherein a second of the floats is located to a second side of the main fuselage which is opposite to the said first side of the main fuselage of the aircraft, and wherein the floats are each secured to the aircraft so that they can each assume at least two positions, a first of which is an extended position and a second of which is a retracted position, the floats being each arranged when in the retracted position to be located with respect to the main fuselage so that a substantial portion of the surface area of each respective float that acts to support the aircraft in the water in the floating on water status is shielded from contributing substantially to air flow resistance of the aircraft when in flight, and wherein each of the floats has a portion which is articulated with respect to a further part of the float so that in a retracted position the float is articulated to assume a more streamline alignment with the fuselage.

13. A twin float aircraft with its floats each being secured to the aircraft so that they can each assume at least two positions, a first of which is an extended position and a second of which is a retracted position, and being arranged when in an extended position, to at least substantially support the aircraft in a floating on water status providing sufficient buoyancy and stability for the aircraft during take off and landing, the aircraft having a first of the floats located to one side of a main fuselage of the aircraft, and a second of the floats located to a second side of the main fuselage which second side is opposite to the said first side of the main fuselage of the aircraft, the floats being each arranged when in the retracted position to be located with respect to the main fuselage so that a substantial portion of the surface area of each respective float is shielded from contributing substantially to air flow resistance of the aircraft when in flight, each of the floats having a portion which is articulated with respect to a further part of the float, and being arranged such that when the float is supported to be in an extended position, the float has a first articulated position, and when the float is supported to be in a retracted position, the float has a second articulated position which is different from the said first articulated position, wherein at least one of the floats is comprised of at least two portions one of which is at or is a forward end of the float and one of which is at or is a rearward end of the float, the two portions being connected so that they are moveable one with respect to the other and are articulated thereby.

14. A twin float aircraft as in claim 13 further comprising a fairing forming a portion of the main fuselage which is at a forward part of the fuselage and such that, in the retracted position, each of the floats is positioned relative to the fairing so that there is an alignment providing a substantially streamline shape across the fairing and from the fairing to each respective float.

15. A twin float aircraft as in claim 13 further comprising a fairing forming a portion of the main fuselage which is at a forward part of the fuselage and such that, in the retracted position, each of the floats is positioned relative to the fairing so that there is an alignment providing a substantially streamline shape across the fairing and from the fairing to each respective float each of which is located behind the fairing.

16. A twin float aircraft as in claim 13 wherein each of the floats is arranged and supported so as to be adapted to be able to be moved to a third position which is a position that is beyond the extended position.

17. A twin float as in claim 13 wherein each of the floats is arranged and supported so as to be adapted to be able to be moved to a third position which is a position that is beyond the extended position and a wheel is supported and located with each respective float so as to act as an undercarriage wheel for the aircrat when the respective float is so further positioned.

18. A twin float aircraft as in claim 13 wherein each of the floats has a portion which is articulated with respect to a further part of the float so that in a retracted position the float is articulated to assume a more streamline alignment with the fuselage.

19. A twin float aircraft as in claim 13 wherein the aircraft is a fixed wing aircraft.

20. A twin float aircraft as in claim 13 wherein the aircraft is a model aircraft.

21. A twin float aircraft as in claim 13 wherein each of the floats in a retracted position is located so as to be positioned in an adjacent relationship with a fuselage of the aircraft.

22. A twin float aircraft as in claim 13 wherein each float when in a retracted position is positioned so that the surfaces of the respective float which were lowermost in the extended position are positioned to not be outer surfaces when in the retracted position.

23. A twin float aircraft as in claim 13 wherein there is a stub wing which can carry with it frame members provide for support of a float both in a retracted and in an extended position.

24. A twin float aircraft with its floats each being secured to the aircraft so that they can each assume at least two positions, a first of which is an extended position and a second of which is a retracted position, and being arranged when in an extended position, to at least substantially support the aircraft in a floating on water status providing sufficient buoyancy and stability for the aircraft during takeoff and landing, the aircraft having a first of the floats located to one side of a main fuselage of the aircraft, and a second of the floats located to a second side of the main fuselage which second side is opposite to the said first side of the main fuselage of the aircraft, the floats being each arranged when in the retracted position to be located with respect to the main fuselage so that a substantial portion of the surface area of each respective float is shielded from contributing substantially to air flow resistance of the aircraft when in flight, each of the floats having a portion which is articulated with respect to a further part of float, and being arranged such that when the float is supported to be in an extended position, the float has a first articulated position, and when the float is supported to be in a retracted position, the float has a second articulated position which is different from the said first articulated position, wherein each of the floats is comprised of at least two portions one of which is at or is a forward end of the float and one of which is at or is a rearward end of the float, the two portions being connected so that they are moveable one with respect to the other and are articulated thereby, and such that when the floats are in an extended position they assume a first articulated position, with a forward portion being substantially linearly aligned with the rearward portion and when in a retracted position they are in a further articulated position in which the rearward portion is inclined with respect to the forward portion with a most rearward portion of the rearward portion being highest so as to substantially conform an alignment of an upper part of the float with an underneath upwardly inclined alignment of a rearward part of the main fuselage.

* * * * *